United States Patent [19]

Goss

[11] 4,064,545
[45] Dec. 20, 1977

[54] MAGNETIC COUPLING OF DISK FILE MODULE

[75] Inventor: Lloyd Chambers Goss, Bloomington, Minn.

[73] Assignee: Control Data Corporation, Minneapolis, Minn.

[21] Appl. No.: 767,703

[22] Filed: Feb. 10, 1977

[51] Int. Cl.² .................... G11B 23/02; G11B 17/02
[52] U.S. Cl. ........................................ 360/133; 360/98
[58] Field of Search ............................ 360/133, 97-99

[56] References Cited
U.S. PATENT DOCUMENTS

| | | | |
|---|---|---|---|
| 3,786,454 | 1/1974 | Lissner et al. | 360/133 |
| 3,864,748 | 2/1975 | Herdman et al. | 360/133 |
| 4,034,411 | 7/1977 | Kraemer et al. | 360/133 |

*Primary Examiner*—Robert S. Tupper
*Attorney, Agent, or Firm*—Edward L. Schwarz

[57] ABSTRACT

An improved disc memory module design in which mechanical force to shift the data transducers and to rotate the discs is supplied through magnetic couplings to the module, thereby avoiding radial stresses created by mechanical couplings such as belts, splined connection shafts, gears, etc. The use of bearings at each end of the spindle and the head arm shaft also reduces the errors induced by radial stresses on the axis of the head arm shaft and spindle.

7 Claims, 1 Drawing Figure

U.S. Patent     Dec. 20, 1977     4,064,545
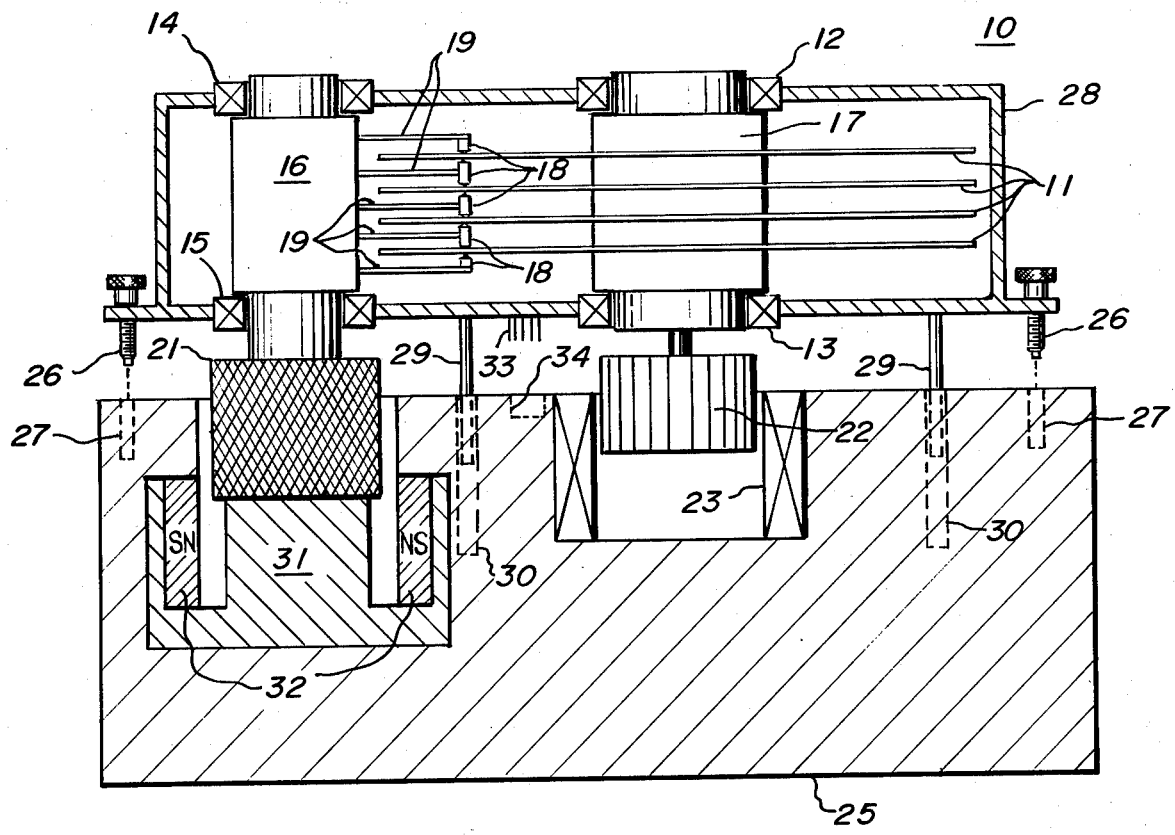

MAGNETIC COUPLING OF DISK FILE MODULE

BACKGROUND OF THE INVENTION

The field of the invention is disc memory devices generally. Specifically, the invention relates to disc memories having detachable disc modules.

In the prior art, the so called Date Module produced by International Business Machines Corporation is the most similar device now existing. It comprises a cantilevered spindle carrying the recording discs and a sliding carriage carrying the head arms, all contained within a plastic housing. When mounted on the appropriate drive unit a belt drives a shaft interlocking with the spindle. An actuator mechanism engages the head arm carriage to position the head arms for accessing the various tracks on the disc. The spindle is cantilevered on two bearings interposed between the disc and the drive shaft attachment point.

A servo read head on one surface of a servo disk containing prerecorded servo tracks provides a head-to-track error signal to the servo control loop. The servo control loop located in the drive unit provides a signal to the actuator to accurately locate the servo head over the desired servo track. The data tracks on the remaining disk surfaces are written and read when the servo head is properly located over the desired servo track. Mechanical stresses and thermal growths can cause positional errors between the data heads and their respective tracks even though the servo head-to-track error is zero.

U.S. Pat. Nos. 232,735D; 3,710,357; 3,786,454; 3,839,920; and 3,843,967 disclose pertinent aspects of said Data Module. In the Data Module, the belt drive on the spindle as shown in U.S. Pat. No. 3,839,920 imposes lateral loads affecting the predetermined accuracy of the spindle position. Furthermore, in the mechanical attachment of the actuator to the head arm carriage, the hardened steel magnetic parts which are required to achieve acceptable wear characteristics cause a varying magnetic bias force on the carriage due to actuator magnet structure leakage which in turn produces proportional servo errors as the carriage moves backward and forward.

A rotary motion head arm assembly with a mechanically connected actuator also requires a complex connecting mechanism. The connecting mechanism will decrease servo loop performance and introduce adverse effects which will result in positional errors. When dealing with track densities as high as 1,000 tracks per radial inch, even small deviations in head to disk alignment across the spindle length can drastically affect the overall positioning accuracy.

BRIEF DESCRIPTION OF THE INVENTION

The improved disc module of the invention is intended to be easily detachable from and attachable to a drive unit. It employs a head arm shaft carrying the head arms and rotating to shift the head arms from track to track.

To avoid the inaccuracy in registration caused by lateral mechanical loading on the spindle and the head arm shaft, this disc module employs magnetic fields to provide the needed torque coupling to the spindle and the head arm shaft from the drive unit. It is preferable that the coupling be effected by means on the spindle and head arm shaft ends creating magnetic fields which interact with magnetic fields produced by the drive unit to produce the desired torques. In a preferred embodiment, the magnetic field producing means on a spindle shaft and head arm shaft comprise respectively the armature of a squirrel cage motor and the armature of a basket type DC motor. Both armatures are physically separate from the drive unit when the module is mounted on it. Detaching the module removes these armatures from the drive unit. Added positional accuracy is created by supporting the disc on a spindle journaled in bearings on both sides of the disc and avoiding the cantilever spindle design.

Accordingly, one purpose of this invention is to allow higher track densities in a recording disc.

A second purpose of this invention is to permit greater track density at the cost of only a small amount of additional apparatus in each detachable module.

BRIEF DESCRIPTION OF THE DRAWING

The FIGURE discloses a side view of the disc memory module detached slightly from its attached or operable position on its drive unit, with its housing sectioned.

DESCRIPTION OF THE PREFERRED EMBODIMENTS

Disc module 10 comprises housing 28 which contains and provides a tight dust cover for the module parts enclosed therein. Module 10 can be attached to and detached from drive unit 25. Spindle 17 is mounted for rotation in housing 28 by coaxial bearings 12 and 13. Discs 11 are concentrically mounted on spindle 17 and parallel to each other. Squirrel cage motor armature 22 is concentrically attached to the lower end of spindle 17. Windings 23 combined with armature 22 comprise a squirrel cage motor when module 10 is in its attached, operable position. Head arm shaft 16 is mounted for rotation in housing 28 by bearings 14 and 15. Basket armature 21 is concentrically attached to the lower end of shaft 16 and is designed to fit between field iron 31 and field magnets 32 when module 28 is in operating position on drive 25. Note that both armatures are supported in cantilever fashion and derive no physical support at all from drive unit 25.

In the FIGURE, module 10 is attached and positioned for operation when the lower surface of housing 10 lies on the upper surface of drive unit 25, and is attached thereto by means such as bolts 26 which engage threads in holes 27. Guide pins 29 engage holes 30 when module 10 is moved from a completely detached to its attached positions, to prevent abrasion between the armatures and drive unit 25 and improper position of module 10 vis-a-vis drive unit 25. Similarly during removal, pins 29 prevent contact between armatures 21 and 22 and their adjacent surfaces in drive unit 25. Head arms 19 are affixed to head arm shaft 16 in a cantilevered fashion and carry at their free ends transducing heads 18. Connector plug 33 and socket 34 provide a path for data signals to and from heads 18 and for control signals for armature 21. Guide pins 29 also prevent harm to the pins in plug 33.

For operation, power applied to windings 23 causes rotation of discs 11. As discs 11 rotate, heads 18 can read or write data on the disc surfaces. Power supplied through plug 33 to armature 21 causes head arm shaft 16 to rotate through the small arcs necessary to keep heads 18 in registration with a desired set of tracks, and to move heads 18 from one track to another as desired. It should be noted that neither armature 21 nor 22 makes any mechanical or physical contact with drive unit 25, reducing radial loads on bearings 12, 13, 14, and 15. Radial loads on these bearings are not totally eliminated of course due to dynamic loading and some possible imbalance in the magnetic forces. They are, however, a fraction of radial loads imposed by belts, gears, cams, or mating shafts. Thus, heads 18 can be more accurately maintained in registration with tracks on discs 11. Outboard location of bearings 12 and 14 further reduce the effect of those radial forces still present.

The preceding describes the invention.

What is claimed is:

1. A magnetic disc memory module of the type easily mounted on and detached from a drive unit incorporating a spindle drive magnetic field generator and a head arm shaft drive magnetic field generator, said module comprising a housing; a spindle mounted for rotation therein; a set of recording discs carried by the spindle; a head arm shaft mounted for rotation in the housing; a set of head arms attached at one end to the head arm shaft and projecting therefrom; a set of heads carried on the head arm, spaced apart from the head arm shaft, and movable into data transducing relationship radially across the disc surface by rotation of the head arm shaft, wherein the improvement comprises a. first magnetic field generator means attached to a first end of the spindle for producing a magnetic field interacting with the spindle drive magnetic field to produce rotation of the spindle, and physically spaced from the drive unit and removable therefrom when detaching the module from the drive unit;

b. second magnetic field generator means attached to a first end of the head arm shaft for producing a magnetic field interacting with the head arm shaft drive magnetic field to produce rotation of the head arm shaft, and physically spaced from the drive unit and removable therefrom when detaching the module from the drive unit; and c. mounting means carried on the housing, for supporting, positioning and detachably fastening the module on the drive unit.

2. The disc module of claim 1, further comprising spindle mounting bearings and head arm shaft mounting bearings respectively located on the spindle and head arm shafts on both sides of the discs and head arms.

3. The disc module of claim 1, wherein the head arm shaft and spindle bearings are positioned to make the head arm shaft and spindle axes parallel, and the magnetic field generator means are on the same side of the disc module.

4. The disc module of claim 1, wherein at least one magnetic field generator means comprises a motor armature.

5. The disc module of claim 4, wherein the second magnetic field generator means is a basket type armature.

6. The disc module of claim 5, wherein the first magnetic field generator means is a squirrel cage armature.

7. The disc module of claim 4, wherein the first magnetic field generator means is a squirrel cage armature.

* * * * *